US010746793B2

(12) United States Patent
Ghalaty

(10) Patent No.: US 10,746,793 B2
(45) Date of Patent: Aug. 18, 2020

(54) ANALYSIS AND REMEDIATION OF FAULT SENSITIVITY FOR DIGITAL CIRCUITS

(71) Applicant: Accenture Global Solutions Limited, Dublin (IE)

(72) Inventor: Nahid Farhady Ghalaty, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 74 days.

(21) Appl. No.: 15/890,768

(22) Filed: Feb. 7, 2018

(65) Prior Publication Data

US 2019/0242946 A1    Aug. 8, 2019

(51) Int. Cl.
*G06F 30/33* (2020.01)
*G01R 31/317* (2006.01)
(Continued)

(52) U.S. Cl.
CPC ... *G01R 31/31725* (2013.01); *G01R 31/3177* (2013.01); *G06F 21/556* (2013.01);
(Continued)

(58) Field of Classification Search
CPC .............. H04L 1/0009; H04L 67/10; G05B 2219/35001; G05B 2219/37434; G05B 23/0289; G05B 23/0291; G05B 23/0297; G06K 9/62; G06N 3/0454; G06N 3/0472; G06N 3/0427; G06N 3/0436; H04B 17/318; Y02P 90/02; G06F 12/0215; G06F 12/0246; G06F 12/0638; G06F 12/0866; G06F 12/12; G06F 21/556; G06F 21/71; G06F 21/75; G06F 21/755; G06F 2212/205; G06F 2212/654; G06F 2212/7203;
(Continued)

(56) References Cited

U.S. PATENT DOCUMENTS

| | | | |
|---|---|---|---|
| 2005/0010880 A1* | 1/2005 | Schubert .......... | G01R 31/31705 716/106 |
| 2014/0247068 A1* | 9/2014 | Smith ................ | H03K 19/0033 326/12 |
| 2018/0032655 A1* | 2/2018 | Levi ..................... | G06F 17/5022 |

OTHER PUBLICATIONS

Boyar et al., "Abstract: A small depth-16 circuit for the AES s-box," Presented at Information Security and Privacy Conference, SEC 2012, Heraklion, Crete, Greece, Jun. 4-6, 2012; 12 pages.
(Continued)

*Primary Examiner* — Binh C Tat
(74) *Attorney, Agent, or Firm* — Fish & Richardson P.C.

(57) ABSTRACT

The present specification is related to analysis of digital circuits for assessing a fault sensitivity of a digital logic circuit. An example method includes: obtaining a set of input vectors that represent possible inputs to the digital logic circuit; for each output gate of the plurality of digital logic gates: (i) for each input vector of the set of input vectors, determining a cumulative output delay for the output gate, and (ii) determining an averaged cumulative output delay for the output gate by averaging the cumulative output delays for the output gate that were determined for multiple input vectors of the set of input vectors; generating a fault sensitivity score for the digital logic circuit based on the averaged cumulative output delays for the output gates of the digital logic circuit; and providing the fault sensitivity score.

21 Claims, 5 Drawing Sheets

(51) Int. Cl.
*G01R 31/3177* (2006.01)
*G06F 21/71* (2013.01)
*G06F 21/75* (2013.01)
*H04L 9/00* (2006.01)
*G06F 21/55* (2013.01)

(52) U.S. Cl.
CPC .............. *G06F 21/71* (2013.01); *G06F 21/75* (2013.01); *G06F 21/755* (2017.08); *H04L 9/004* (2013.01); *H04L 9/005* (2013.01)

(58) Field of Classification Search
CPC ...... G06F 3/0613; G06F 3/065; G06F 3/0659; G06F 3/0679
USPC .................................................. 716/100–109
See application file for complete search history.

(56) References Cited

OTHER PUBLICATIONS

Canright, "Abstract: A very compact s-box for aes," Presented at International Workshop on Cryptographic Hardware and Embedded Systems: Edinburgh, Scotland Aug. 29-Sep. 1, 2005, LNCS vol. 3659, 15 pages.

Ghalaty et al., "Analyzing and eliminating the causes of fault sensitivity analysis," Presented at Conference on Design, Automation & Test in Europe: European Design and Automation Association, Dresden, Germany, Mar. 24-28, 2014, 6 pages.

Lashermes et al., "Abstract: A DFA on AES based on the entropy of error distributions," Presented at Fault Diagnosis and Tolerance in Cryptography (FDTC) Workshop, Leuven, Belgium Sep. 9, 2012, 10 pages.

Li et al., "Abstract: Fault sensitivity analysis," Presented at International Workshop on Cryptographic Hardware and Embedded Systems, Santa Barbara, CA, Aug. 17-20, 2010; LNCS vol. 6225: 15pages.

Morioka et al., "An optimized s-box circuit architecture for low power AES design," Presented at International Workshop on Cryptographic Hardware and Embedded Systems: San Francisco, CA, Aug. 13-15, 2002, LNCS vol. 2523, 15 pages.

Singh et al., "Fault-sensitivity analysis and reliability enhancement of analog-to-digital converters," Transactions on Very Large Scale Integrations (VLSI)Systems, Mar. 2003, vol. 11 Issue 5:839-852.

Wang et al., "A new zero value attack combined fault sensitivity analysis on masked AES," Microprocessors and Microsystems, Jul. 2016, 45: 355-362.

Eldib et al. "Synthesis of Fault-Attack Countermeasures for Cryptographic Circuits", Jul. 13, 2016, International Conference on Computer Analysis of Images and Patters, pp. 343-363.

EP Search Report in European Application No. EP19153272, dated Jun. 26, 2019, 10 pages.

\* cited by examiner

ANALYSIS AND REMEDIATION OF FAULT SENSITIVITY FOR DIGITAL CIRCUITS

TECHNICAL FIELD

The present specification relates to digital logic circuit security, including techniques for assessing and improving a fault sensitivity of a digital logic circuit.

BACKGROUND

Computer and electronic systems that employ digital logic circuitry are susceptible to malicious attacks that exploit system vulnerabilities and potentially cause damaging effects. For instance, Side Channel Attacks (SCA) are a type of fault attack that exploits information leakage gained from the physical implementation of an application or a cryptographic algorithm. SCA attacks are a type of passive fault attack. Fault attacks are based on the concept of fault sensitivity, which refers to the susceptibility of a digital circuit to generate faulty outputs when a fault injection is applied to the circuit. An attacker can record the fault sensitivity information during a fault injection, and can later use this information as a side channel leakage to expose secure data, such as a cryptographic key. FSA relies on the correlation of fault sensitivity information to internal variables of the cryptographic algorithm. As another example, an attacker can inject a fault into one of the intermediate variables of a cryptographic algorithm, for example, with the intention of producing erroneous results. By injecting faults, an attacker can exploit any existing fault sensitivities, and manipulate the circuit from behaving normally (e.g., nominal operation in accordance with the circuit design) to behaving abnormally. FSA attacks typically involve use of fault sensitivity information that is leaked as a result of a fault injection as a side channel leakage.

SUMMARY

This specification describes systems, methods, devices, and other techniques for analyzing digital logic circuits using a metric that measures fault sensitivity, and performing countermeasures to the digital logic circuit that can at least partially remediate the assessed fault sensitivity.

In general, the techniques described herein include devices (or systems) having one or more modules that perform operations to assess fault sensitivity of a digital logic circuit. The operations can account for factors that contribute to fault sensitivity, including arrival time of the signals and the number of logic levels of fault sensitive gates. Furthermore, the device performs a static timing analysis process on a digital logic circuit to determine a value of a metric for fault sensitivity, referred to herein as the fault sensitivity score. Moreover, based at least in part on the fault sensitivity score, the device can implement countermeasures to modify the digital logic circuit based on masking of these factors and partially or wholly eliminating the assessed fault sensitivity. Countermeasure can include automated techniques for inserting delay elements (e.g., buffers) within the gate level netlist of the digital logic circuit, thereby causing the arrival time of the signals and the depth of effective gate network uniform.

Some implementations of the subject matter described herein can realize, in certain instances, one or more of the following advantages. A system can realize a solution that generates a modified digital logic circuit that is optimized for minimizing overhead due to the number of delay elements added to the digital logic circuit, and maximizing the eliminated fault sensitivity. As a result, a digital logic circuit can be hardened against fault attacks and, optionally, can be hardened to an acceptable degree without unduly increasing a physical size of the circuit. In some implementations, the techniques described herein can achieve delay balancing, which can additionally provide protection against SCA attacks. Another benefit of the disclosed system and techniques includes obtaining a metric that can be used in evaluating a digital logic circuit's potential sensitivity to attacks, such as fault attacks. In obtaining a metric indicative of fault sensitivity, this sensitivity can be a quantitative consideration used in determining design tradeoffs (e.g., sensitivity compared to cost) and other constraints related to digital logic design. For instance, a level of countermeasures to fault sensitivity to apply to the circuit can be determined that balances between the cost of the countermeasures (e.g., increase in size of the circuit) and the criticality of the digital logic circuit.

An innovative aspect of the subject matter described in this specification can be embodied in a computer-implemented method, including: obtaining a set of input vectors that represent possible inputs to the digital logic circuit, each input vector comprising a unique sequence of binary values; for each output gate of the plurality of digital logic gates: for each input vector of the set of input vectors, determining a cumulative output delay for the output gate, the cumulative output delay representing a time delay between application of the input vector to the digital logic circuit and generation of a stable output value by the output gate as a result of the application of the input vector to the digital logic circuit, and determining an averaged cumulative output delay for the output gate by averaging the cumulative output delays for the output gate that were determined for multiple input vectors of the set of input vectors; generating a fault sensitivity score for the digital logic circuit based on the averaged cumulative output delays for the output gates of the digital logic circuit; and providing the fault sensitivity score.

Another innovative aspect of the subject matter described in this specification can be embodied in a computer-implemented method, including: identifying, by a computing system, a schematic for an initial version of the digital logic circuit, the schematic specifying a plurality of digital logic gates and connections among the plurality of digital logic gates in the initial version of the digital logic circuit; determining a cumulative output delay for each output gate of the plurality of digital logic gates in the initial version of the digital logic circuit; and generating, by the computing system, a modified version of the digital logic circuit by iteratively adding delay elements to the initial version of the digital logic circuit until one or more criteria for the modified version of the digital logic circuit are satisfied, including that a variance between the cumulative output delays of the output gates is within a threshold.

Yet another innovative aspect of the subject matter described in this specification can be embodied one or more non-transitory computer-readable media having instructions stored thereon that, when executed by one or more processors of a computing system, cause the computing system to perform operations, including: identifying a schematic for an initial version of the digital logic circuit, the schematic specifying a plurality of digital logic gates and connections among the plurality of digital logic gates in the initial version of the digital logic circuit; determining a cumulative output delay for each output gate of the plurality of digital logic gates in the initial version of the digital logic circuit; and generating a modified version of the digital logic circuit by iteratively adding delay elements to the initial version of the digital logic circuit until one or more criteria for the modified version of the digital logic circuit are satisfied, including that a variance between the cumulative output delays of the output gates is within a threshold.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems, methods, devices, and other techniques for analyzing a digital logic circuit to determine a value of a metric that represents a level of a fault sensitivity of the circuit, and performing countermeasures to the digital logic circuit correlating to the assessed fault sensitivity.

Figure 1:
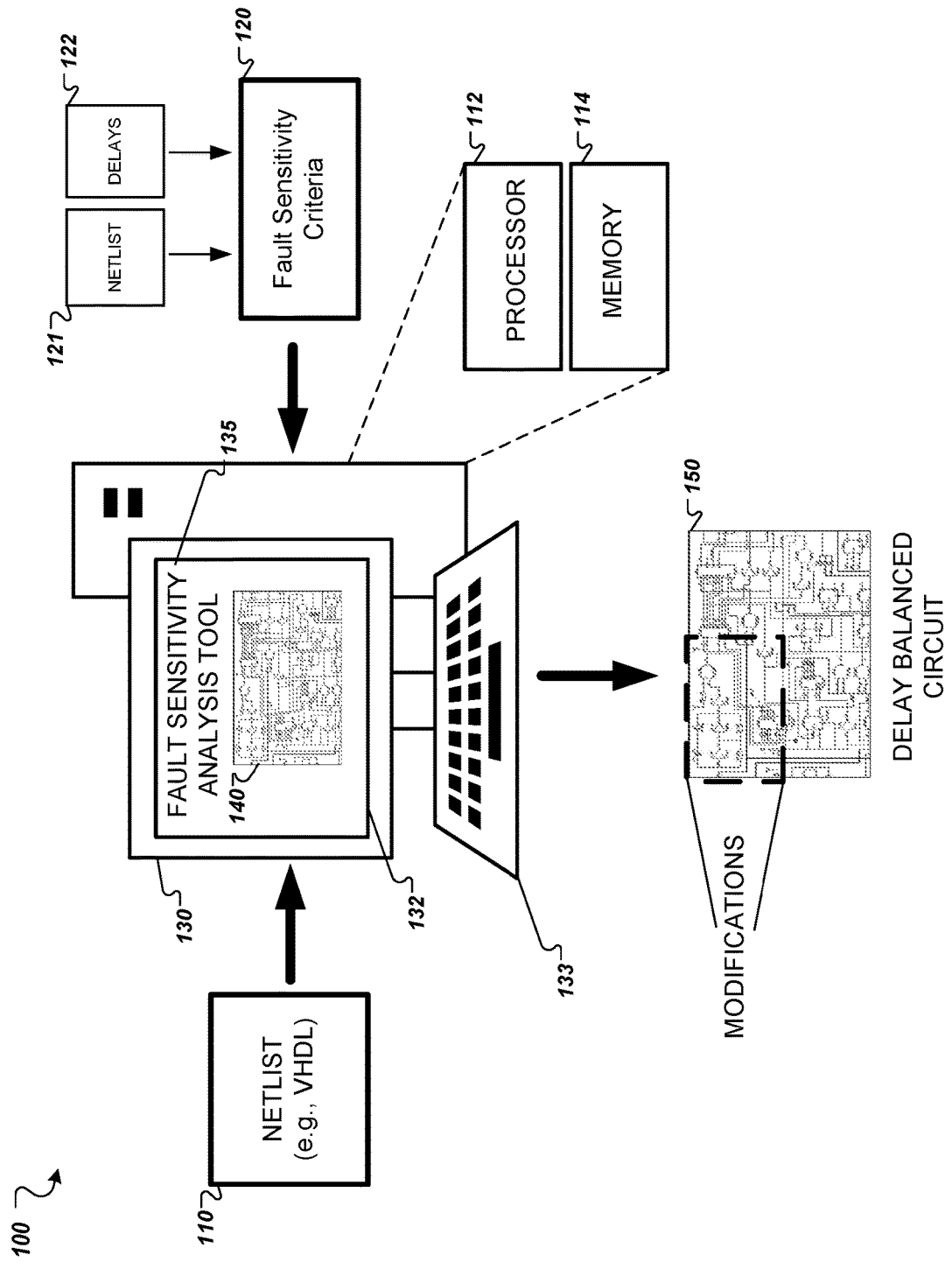
FIG. 1 illustrates a block diagram of an example computing system for implementing circuit analysis to calculate a fault sensitivity score of a digital logic circuit and implementing circuit analysis to modify the circuit according to fault sensitivity countermeasures.

Referring to FIG. 1, a block diagram is shown of an example computing system 100 for implementing circuit analysis to generate a fault sensitivity score of a digital logic circuit 140 and implementing circuit analysis to modify the digital logic circuit 140 according to fault sensitivity countermeasures. The computing system 100 includes a computer device 130 configured to execute various electronic design automation (EDA) tools, for example computer-aided software tools which can be used in the design, synthesis, and analysis of electronic systems. Examples of an electronic system can include, digital electronic circuitry, integrated circuitry, and specially designed ASICs (application specific integrated circuits). The digital logic circuit 140 can be generally characterized as including a plurality of digital logic gates arranged to manipulate digital signals in a manner that executes a specific function for the circuit 140. The digital logic gates that comprise the digital logic circuit 140 can be described as electronic devices/components having one or more inputs, and at least one output that conveys a signal as a result of a corresponding logical operation, which is performed by the gate on the combination of inputs.

A user that oversees design of the digital electronic circuitry, such as a hardware design engineer, can utilize the computer device 130 to generate and/or manipulate a visualization of digital logic circuit 140 (e.g., a schematic). Also, a user can employ computer device 130 to manipulate information relative to the digital logic circuit 140, for instance in performing timing analysis or simulation. Accordingly, the computer device 130 can be used to perform one or more processes involved in the design of a digital logic circuit 140. As shown in FIG. 1, computer device 130 is illustrated to include Fault Sensitivity Analysis Tool 135 for implementing various circuit analysis techniques to analyze the digital logic circuit 140, particularly relating to fault sensitivity. Additionally, the Fault Sensitivity Analysis Tool 135 implements fault sensitivity countermeasures. Therefore, the computer device 130 and Fault Sensitivity Analysis Tool 135 can be used to automate a calculation of a fault sensitivity score for the digital logic circuit 140, and a modification of the circuit 140 to mitigate potential abnormal behavior due to fault attacks.

The computer device 130 is illustrated in FIG. 1 as a desktop computer (e.g., computerized workstation), but may also take alternative forms, including wireless computing devices, such as a laptop computer, a tablet or slate computer, and a personal digital assistant. The computer device 130 can be implemented locally at a user's location or remotely on one or more servers. In some implementations, the computer device 130 employs parallel or distributed processing techniques across processors in one or more computers in one or more locations. In some cases, the computer device 130 can be connected to a computer network, which can be a private network, a public network, a virtual private network, etc. Examples of computer networks include, but are not limited to, a local area network (LAN), a wide area network (WAN), and the Internet. Although FIG. 1 shows Fault Sensitivity Analysis Tool 135 as being a module that executes the fault sensitivity analysis techniques within the processing elements of computer device 130, in alternative implementations the functions can be incorporated in a stand-alone computer device that is communicatively connected to computer device 130, for instance by a computer network.

The computer device 130 is depicted as including an output device 132 for presenting content to a user of the computer device 130, and an input device 133 for receiving user inputs. The output device 132 may be a display, for example a CRT (cathode ray tube) or LCD (liquid crystal display) monitor, for displaying information to the user such as video, graphics, images, and text. Input device 133 may be a mechanism for receiving user-input, illustrated as a keyboard (e.g., full QWERTY keyboard) that includes keys for the digits '0-9', '*', and '#.' In some cases, input device 133 can include additional devices, for example a pointing device (e.g., a mouse or a trackball) by which a user can provide input to the computer device 130. Note that while shown as separate devices in FIG. 1, in another implementation the output device 132 and input device 133 can also be integrated with each other and/or with the computer device 130, such as in a tablet computer.

In an implementation, the output device 132 can include input capabilities, such as a touchscreen, where various "virtual" input mechanisms may be produced. A user can interact with a graphical user interface (GUI) element depicted on the output device 132 by contacting the GUI element on the display. An example of a "virtual" input mechanism is a "software keyboard," where a keyboard is displayed on the touchscreen and a user selects keys by pressing a region of the touchscreen that corresponds to each key. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

FIG. 1 shows the computer device 130 to include a processor 112 and a memory 114. The processor 112 can be one or more hardware processors, which can each include multiple processor cores. The memory 114 can include both volatile and non-volatile memory, such as Random Access Memory (RAM) and Flash RAM. The computer device 130 can include various types of computer storage media and devices, which can include the memory 114, to store instructions of programs that run on the processor 112.

Such programs, as previously described to be included in computer device 130, can include Fault Sensitivity Analysis Tool 135, which can run locally on computer device 130. In some implementations, the Fault Sensitivity Analysis Tool 135 can execute remotely on a computer of one or more remote computer systems (e.g., in a third party provider's server system accessible by the computer device 130), or on a combination of one or more of each of the preceding. Fault Sensitivity Analysis Tool 135 can present a GUI employed for displaying, or otherwise rendering, a representation of digital logic circuit 140. FIG. 1 illustrates a schematic of the digital logic circuit 140 that includes visual representations of the circuit elements comprising the circuit, such as logic gates and wire connections, as being displayed on output device 132 of the computer device 130. Additionally, a GUI provided by the Fault Sensitivity Analysis Tool 135 can be employed for various user interactions with the fault sensitivity analysis techniques as described in detail below.

The Fault Sensitivity Analysis Tool 135 is programmed to perform one or more circuit analysis techniques, for instance static timing analysis, to measure a fault sensitivity of the digital logic circuit 140. As an example, the digital logic circuit 140 can be susceptible to various fault injections that exploit setup time violations, such as over-clocking and under-voltaging (e.g., reducing the voltage level of the device). In the case of over-clocking, an increase in clock frequency can, in turn, increase a fault intensity that disturbs the operation of the digital logic circuit 140. For example, as the digital logic circuit 140 is exposed to an increased fault intensity, a potential for the circuit to show faulty behavior gradually increases. The digital logic circuit 140 can have multiple outputs, each output having paths of different lengths to reach the respective output. Due to these varying lengths, each path in the digital logic circuit 140 can potentially fail at a specific frequency during an over-clocking based fault injection (e.g., involving various fault intensities). A delay can be associated with traversing a path (e.g., fault sensitive path) having a particular length in a circuit. Accordingly, delays experienced by the logic gates which comprise a circuit are an observed factor that affect the fault sensitivity of that particular circuit. FIG. 1 conceptually shows that execution of the Fault Sensitivity Analysis Tools 135 considers a netlist 121 corresponding to digital logic circuit 140 and delays 122 associated with the fault sensitive paths in the digital logic circuit 140.

In some implementations, a design for the digital logic circuit 140 is synthesized by the system 100 to gate-level primitives, for example, in a logic synthesis process. Synthesis generally refers to a process for generating the low-level hardware components of a circuit, such as the gate-level primitives. Thus, a result of performing synthesis on a received design (e.g., that was generated using a high-level hardware description language, such as Verilog or Very High speed integrated circuit Hardware Description Language (VHDL)) can be construction of a netlist 110 from the implementation specified in the design. The netlist 110 can be generated at the gate level and can include a description of the connections within the hardware design. As an example, the generated netlist 110 can include a list of the terminals (e.g., inputs and outputs) of the electronic components in the digital logic circuit 140, and the electrical conductors that interconnect the terminals. Furthermore, a netlist 121 including the terminals of the digital logic circuit 140 and delays 122 relating to the terminals referred to by the netlist 121, can be parameters used by an algorithm associated with a Fault Sensitivity Criteria 120 (also referred to as the fault sensitivity score) for the circuit. In some implementations, analyzing a circuit for Fault Sensitivity Criteria 120 involves executing a static timing analysis on the digital logic circuit 140, which generates a calculated fault sensitivity score as the result.

The fault sensitivity score can be a value within a predefined range, for instance [0,1], which can be described as a probabilistic risk associated with the digital logic circuit 140 that represents its vulnerability to FSA. In some scenarios, the Fault Sensitivity Analysis Tool 135 produces a fault sensitivity score that approaches an upper limit within the predefined range (e.g., approximately close to 1). In this case, a larger fault sensitivity score can mathematically represent that the digital logic circuit 140 is more vulnerable to fault sensitivity attacks, as analyzed in accordance with the Fault Sensitivity Criteria 120. Alternatively, a fault sensitivity score having a lower value that approaches the lower limit within the predefined range (e.g., approximately close to 0) can indicate that the digital logic circuit 140 is less vulnerable to fault sensitivity attacks. A fault sensitivity score equaling either of the limits of the predefined range signifies that the design for the digital logic circuit 140 can potentially experience an extreme in fault sensitivities. As an example, the Fault Sensitivity Analysis Tool 135 can calculate a fault sensitivity score of 0, which indicates that the digital logic circuit 140 has been analyzed to show no fault sensitivity.

Additionally, in some implementations, the Fault Sensitivity Analysis Tool 135 implements the disclosed fault sensitivity countermeasure techniques for a digital logic circuit 140 based, at least in part, on the calculated fault sensitivity score. The Fault Sensitivity Analysis Tool 135 can be configured to apply one or more criteria to information output from circuit analysis relating to fault sensitivity to prompt the execution of countermeasures. In instances where the fault sensitivity score is used as a criteria, the Fault Sensitivity Analysis Tool 135 may trigger countering actions if the algorithm for Fault Sensitivity Criteria 120 outputs a value determined to exceed a predetermined threshold (e.g., relating to a fault sensitivity for a circuit design that is required to be reduced). Conversely, in some implementations, a fault sensitivity score that is lower than a predetermined threshold (e.g., relating to a fault sensitivity for a circuit design that is not required to be reduced) can preclude executing any fault sensitivity countermeasures. Initiating the fault sensitivity countermeasure aspects of the analysis can be performed automatically by the system 100, or manually by a user responsible for the design of the digital logic circuit 140.

In some implementations, the countermeasure techniques can involve performing additional static timing analysis on the digital logic circuit 140, which considers its determined fault sensitivity criteria, and results in modifying the circuit 140 in a manner that reduces the associated fault sensitivity. Modifications to the digital logic circuit 140 can include various delay insertion techniques, for instance adding specified delay elements to particular portions of the digital logic circuit 140 such that the paths within the circuit 140 are associated with a uniform delay. FIG. 1 illustrates an example of a result of the fault sensitivity countermeasure aspects of the Fault Sensitivity Analysis Tool 135 as a schematic of a delay balanced circuit 150, which can be described as digital logic circuit 140 including modifications that serve to yield a fault sensitivity metric that differs from that of circuit 140.

In some implementation, fault sensitivity countermeasures are implemented as a portion of an iterative fault sensitivity analysis process, which receives an initial digital logic circuit 140, outputs a modified delay balanced circuit 150, and further analyzes the circuit 150 to determine a new fault sensitivity score associated with the modified circuit 150. Moreover, in the case of an iterative process, further modifications to the circuit 150 can be performed based on its fault sensitivity as deemed necessary or appropriate. Accordingly, the Fault Sensitivity Analysis Tool 135 can perform successive iterations until one or more satisfying criteria are met, such as a circuit design having a corresponding fault sensitivity score that equals a predetermined value associated with an acceptable vulnerability to fault sensitivity attacks.

Additionally, in some implementations, the Fault Sensitivity Analysis Tool 135 performs optimization of the design of the delay balanced circuit 150 by determining a number and/or arrangement of delay elements added to the circuit 150 (such that the paths within the circuit 140 are associated with a uniform delay) based on area and/or size constraints for the circuit. In some implementations, fault sensitivity countermeasures can exhaustively add delay elements in each path of the circuit 150, until each path reaches the maximum delay of the circuit to achieve a desired path uniformity. However, a brute force approach can incur larger area overhead on the circuit. In accordance with implementations implementing optimization, an artificial intelligence (AI) heuristic, for example a genetic algorithm, can be applied to achieve a balance between the number of delay elements added to the circuit to eliminate fault sensitivity, and the resulting size (e.g., area) of the circuit. For purposes of discussion in the specification, the genetic algorithm is described, but it should be appreciated that other forms of AI heuristics, not limited to the genetic algorithm, can be applied for optimizing the digital logic circuit design.

The genetic algorithm can contain a population of strings, where each string represents a set of gates, for example a set of two gates. Delay insertion can involve adding delay elements to a location of the circuit that is between the two gates. The strings can have related chromosomes, where each chromosome is weighted with a number of that can be the function of its level in the circuit and the gate number. A population selection can be on the weight of the chromosomes. The genetics algorithm can minimize an area of overhead of the delay insertion. The population can include all of the valid pairs of digital logic gates that can possibly have delay elements in between. The constraints for the genetic algorithm can involve maintaining the fault sensitivity score at an acceptable number, for instance below a threshold, and minimizing the difference between the maximum delay and the minimum delay for each output. Therefore, the Fault Sensitivity Analysis Tool 135 executes the aforementioned analysis techniques to effectively eliminate, or substantially reduce, fault sensitivity of the digital logic circuit 140 (e.g., fault free condition) while balancing the design tradeoffs associated with circuit area overhead.

Figure 2:
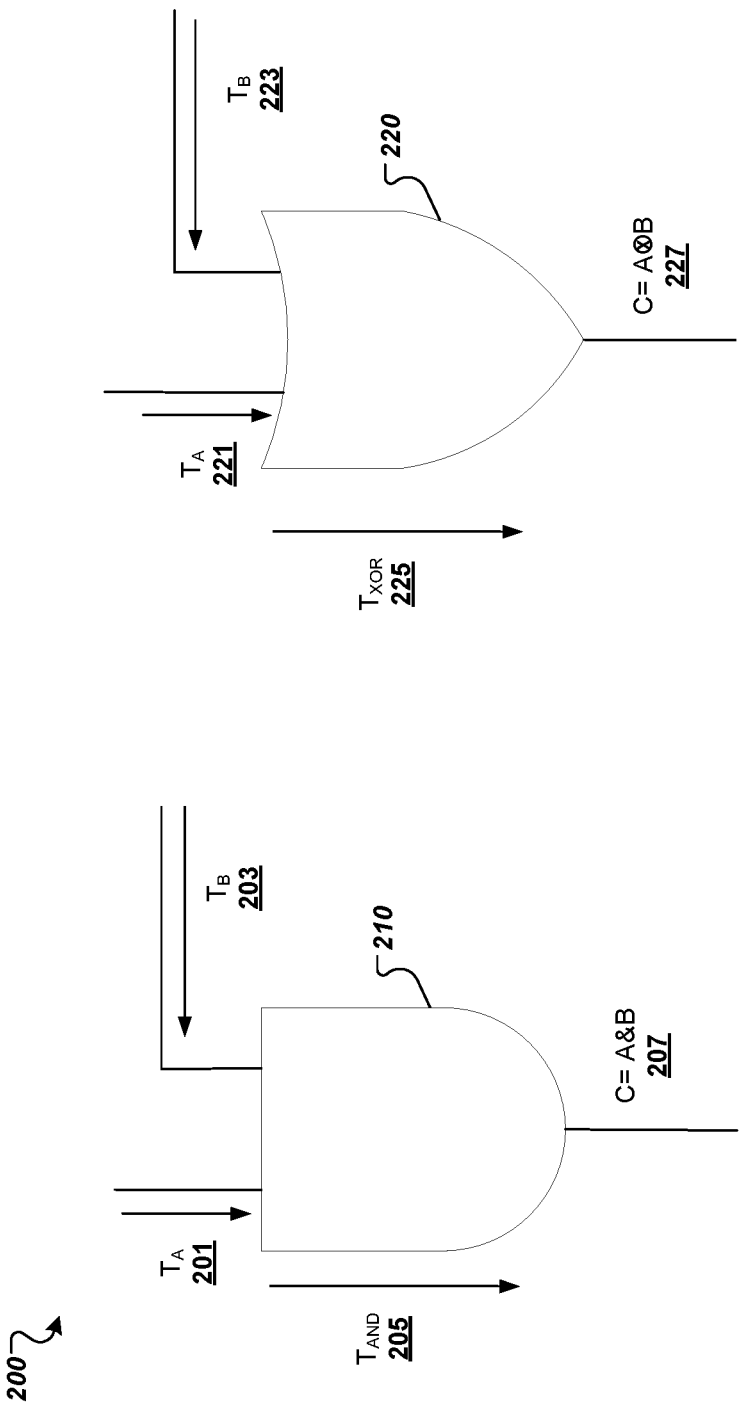
FIG. 2 illustrates examples of digital logic gates and depicts an example of a data dependency that correlates to a fault sensitivity for the respective gate relative to calculating a fault sensitivity score of a digital logic circuit.

Assessing fault sensitivity can relate to the concept that fault sensitivity and path delays in a digital logic circuit are data dependent. For example, digital logic gates can become sensitive to faults in the event that their inputs have different arrival times. FIG. 2 illustrates examples 200 of digital logic gates 210, 220 and depicts an example of a data dependency that correlates to a fault sensitivity for the respective gate relative to calculating a fault sensitivity score of a digital logic circuit. An arrival time of an input signal of a digital logic gate can be described as the time it takes from issuing the input to a module, until the time it affects the inputs of that digital logic gate. An arrival time of signal Z can be indicated as $T_z$. FIG. 2 illustrates examples of this concept in the case of an AND gate 210 and an XOR gate 220. As shown, AND gate 210 is associated with an arrival time for a first input signal A and another arrival time for a second input signal B, illustrated as $T_A$ 201 and $T_B$ 203, respectively. Also, the AND gate 210 itself can have a delay associated with the signal propagating through the element, illustrated as $T_{AND}$ 205. An output signal C 207 is also shown. Output signal C 207 can be the signal generated as output by the AND gate 210, as a result or performing the logical operation on the received input signals.

In this case of the AND gate 210, FIG. 2 shows that input signal B traverses a longer path than input signal A in order to arrive at the AND gate 210. Thus, it can be assumed that an arrival time for input signal A, shown as $T_A$ 201, is less than an arrival time for input signal B, shown as $T_B$ 203 (i.e., $T_A<T_B$). Due to the differences in arrival times in this instance, (e.g., input signal A arrives before input signal B), the output delay of output signal C 207 depends on the value of A. Restated, the AND gate 210 can have a data dependency to the input signal having the shortest delay path, which is $T_A$ 201 in this case. In continuing with the example, the bit value of the input signal A can be set to "0" (i.e., A=0). In this scenario, an output delay for output signal C 207, can be predominately determined by $T_A$ 201 plus a comparatively small constant delay determined by the AND gate 210, which is $T_{AND}$ 205. This can be represented as a logical expression below:

$$\text{If } A=0, \text{ then } T_C=T_A+T_{AND} \quad (2)$$

In another instance, the bit value of the input signal A can be set to "1" (i.e., A=1). The input signal A does not affect the eventual value of the output signal C 207, and any transition on the output signal C 207 can be determined by the transitions on the input signal B. This can be represented as a logical expression below:

$$\text{If } A=1, \text{ then } T_C=T_B+T_{AND} \quad (3)$$

The example serves to illustrate that the AND gate 210 has an output delay that is dependent upon, or changes based on, the particular value of the input. Even further, the AND gate 210 can be described as fault sensitive, as the switching time of the digital logic gate depends on the value of an input bit for input signal A. Other digital logic gates can be described as having fault sensitive characteristics, for example OR gates can be considered fault sensitive.

In contrast, FIG. 2 also shows an example of data dependency in the case of XOR gate 220, which is not fault sensitive. As shown, XOR gate 220 is associated with an arrival time for a first input signal A and another arrival time for a second input signal B, illustrated as $T_A$ 221 and $T_B$ 223, respectively. Also, the XOR gate 220 itself can have a delay associated with the signal propagating through the element, illustrated as $T_{XOR}$ 225. An output signal C 227, generated as output by the XOR gate 220, is also shown.

The output signal C 227 will propagate changes to either input signal A or input signal B with the same preference. Therefore, the input signal having the maximum arrival time, regardless of the value, will predominately effect the output, plus a comparatively small constant delay determined by the XOR gate 220. This can be represented as a logical expression below:

$$T_C = \max(T_A, T_B) + T_{XOR} \qquad (4)$$

Examples of the relationship between data dependency and output delay for different logic gates can be shown in the Table II below:

|     | A | B | $T_C$ |
| --- | --- | --- | --- |
| AND | 0 | x | $T_C = T_A + T_{AND}$ |
| AND | 1 | x | $T_C = \max(T_A, T_B) + T_{AND}$ |
| OR  | 1 | x | $T_C = T_A + T_{OR}$ |
| OR  | 0 | x | $T_C = \max(T_A, T_B) + T_{OR}$ |
| XOR | x | x | $T_C = \max(T_A, T_B) + T_{XOR}$ |

Various factors that affect a digital logic circuit to show data dependency of fault sensitivity can include:
1) The type of gates in the design: The gates that cause data dependency of fault sensitivity are AND, OR and related combinations. XOR and XNOR gates do not affect the data dependency of the critical timing delay since their output always depends on both data inputs.
2) The differential depth of the effective gate network: If $G_E$ is defined as the number of logic levels along any path from input to output that contain effective gates such as AND and OR, then the differential depth of the effective gate network is $\max G_E - \min G_E$.
3) The arrival time of signals to the inputs of the effective gate network.

Additionally, implementations of the circuit analysis techniques can include categorizing logic gates as being either fault sensitive, or fault insensitive. Fault sensitive gates can be described as having an output delay that is dependent upon the value of the controlling input and the arrival time of the input. The controlling input can be the input that is determined to have a value which causes a difference in the delay of output generation for the logic gate. Categorizing digital logic gates can be directly related to the type of logic gate, where certain gates are assigned a known category. For example, logic gates that are identified as AND gates, OR gates, NAND gates, and NOR gates can be categorized as sensitive gates. Alternatively, logic gates that can be categorized as insensitive gates include XOR gates and NOR gates. Fault insensitive gates can be described as logic gates which require both input values to generate the output, thus their delay is independent of the value of the input. Referring to FIG. 2, circuit analysis techniques can identify AND gate 210 as fault sensitive, and XOR gate 220 as fault insensitive. In some implementations, the procedure for assessing fault sensitivity of digital logic circuit receives an indication of whether a gate is insensitive or sensitive as a parameter corresponding to the gate. Thus, the disclosed analysis techniques, such as the technique discussed below in reference to FIG. 3, can consider data dependency as a factor in calculating fault sensitivity scores.

Figure 3:
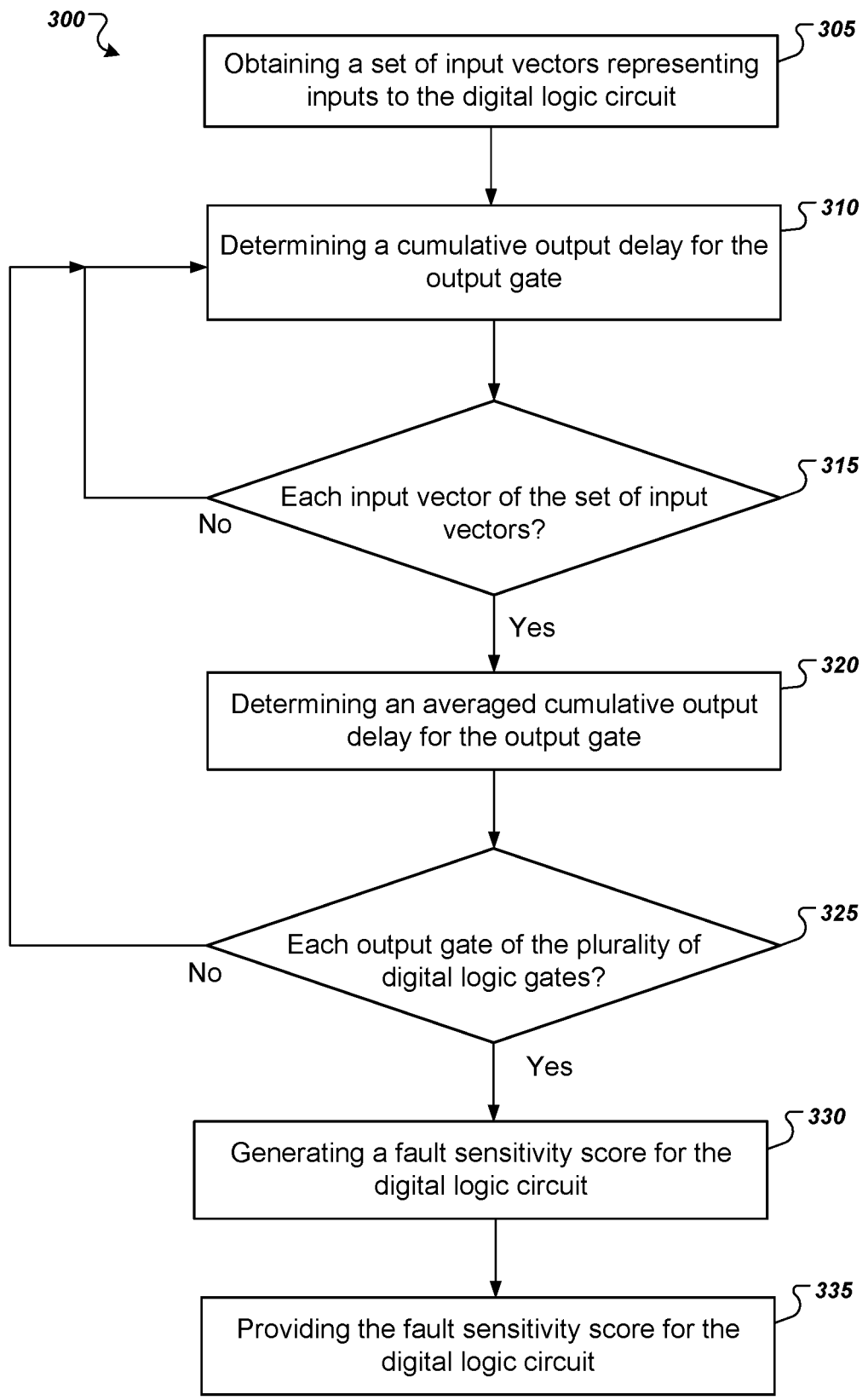
FIG. 3 illustrates a flow chart of an example process for calculating a fault sensitivity score of a digital logic circuit based on circuit analysis techniques relative to the example computing system of FIG. 1.

FIG. 3 illustrates a flow chart of an example process 300 for calculating a fault sensitivity score of a digital logic circuit based on circuit analysis techniques relative to the example computing system of FIG. 1. Process 300 begins at block 305 and includes obtaining, by a device such as computer device 130, a set of input vectors that represent possible inputs to the digital logic circuit. The digital logic circuit can include a plurality of digital logic gates. Examples of digital logic gates can include, but are not limited to, AND gates, OR gates, Not AND (NAND) gates, Not OR (NOR) gates, and Exclusive OR (XOR) gates. Also, the digital logic circuit includes output gates, which can be a proper subset of the plurality of digital logic gates in the digital logic circuit that produce an output signal for the digital logic circuit. In some cases, data extracted from a netlist representing the digital logic circuit, including the associated plurality of gates, is received as input into the process 300. Each input vector can be a unique sequence of binary values.

In some cases, obtaining the set of input vectors further involves performing a simulation for each input. While simulating the circuit with a specific input having a particular value, the process 300 can determine delays associated with the respective input values for each digital logic gate. The process 300 can utilize an algorithm that calls a delay function for each digital logic gate during the abovementioned simulation. In some cases, delays in the logic are known by the technology used in manufacturing the integrated circuit (IC) or chip. The delay function receives as input various parameters, including a type of gate, the value of the inputs and the arrival time of the inputs.

Thereafter, the process 300 proceeds as an iterative subroutine, including block 310 through block 320, which performs the respective actions for each output gate of the plurality of digital logic gates. Block 310 includes determining a cumulative output delay for various output bits generated by the current output gate (e.g., output gate corresponding to the iteration). The cumulative output delay can represent a time delay between applying a signal conveying the input vector to the digital logic circuit, including propagating through a path associated with the gate, to generate a stable output value, or output bit, by the output gate. Furthermore, block 310 is the start of a nested subroutine which iteratively performs the abovementioned determination for each input vector corresponding to the current output gate. As mentioned above, the circuit is associated with a set of input vectors.

Then, at block 315, a check is performed to determine whether a cumulative output delay has been calculated for each of the input vectors in the set. In this case, input vectors include values that are possible inputs to the digital logic circuit, such as a unique sequence of binary values. In instances where each input vector of the set of input vectors has been evaluated, illustrated as "Yes" in FIG. 3, process 300 exits the iterative loop to proceed to block 320. Otherwise, the process 300 returns to block 310 to determine a cumulative output delay for the next input vector in the set. The process 300 can iteratively repeat blocks 310 and 315 until the exit condition has been met. In some cases, determining a cumulative output delay for an output gate involves considering whether the gate is a sensitive gate. The delay for generating output bits for a sensitive gate is determined based on the arrival time of a controlling input, which is discussed in greater detail above in reference to FIG. 2. Regarding output gates that are not sensitive, or insensitive gates, the output delay of the output bits is based on the delay of the gate itself. Accordingly, in some instances, block 310 involves summing an arrival delay time of a controlling input for the output gate and a gate delay time of the output gate.

Next, block 320 includes determining an averaged cumulative output delay for the output gate. In an implementation, block 320 involves averaging the cumulative output delays for the output bits that were determined for multiple input vectors of the set of input vectors. Averaging can include the cumulative output delays for all of the input vectors, in some cases. Performing the averaging of block 320 can result in Table I shown below:

|  |  | output |  |  |
| --- | --- | --- | --- | --- |
|  |  | $Y_1$ | ... | $Y_n$ |
| input | $X_1$ | $d_{11}$ | ... | $d_{1n}$ |
|  | ... | ... | ... | ... |
|  | $X_m$ | $d_{m1}$ | ... | $d_{mn}$ |
| Average |  | AVG $d_{X1}$ | ... | AVG $d_{Xn}$ |
| Maximum |  | MAX $d_{X1}$ | ... | MAX $d_{Xn}$ |

In referring to Table I (in which Y columns show the number of the output bit and X rows show the input bit), block 320 can be described as performing averaging on each column and for each output bit.

Subsequently, at block 325, a check is performed to determine whether output bits from each of the plurality of digital logic gates has been evaluated. The condition for exiting the iterative subroutine is satisfied when all output gates of the circuit are considered, illustrated as "Yes" in FIG. 3. Thus, process 300 exits the iterative loop to proceed to block 330. If additional output gates remain, illustrated as "No" in FIG. 3, the process 300 returns to block 310 to determine a cumulative output delay for the next output gate. The process 300 also repeats the nested subroutine of block 310 and block 315 for each input vector, while repeating an iteration for each output gate until the exit condition has been met, and generates cumulative output delays for output bits from each gate of the digital logic circuit.

Thereafter, block 330 includes generating a fault sensitivity score for the digital logic circuit based on the averaged cumulative output delays. The fault sensitivity score can be calculated at block 330 by a device, such as the computer device 130 executing Fault Sensitivity Analysis Tool 135, that is configured to implement the equation below:

$$FSC = 1 - \frac{\sum_{i=1}^{n} AVG\_d_{Xi}}{n * \max(AVG\_d_{Xi})} \quad (1)$$

where FSC is the fault sensitivity score;
AVG_$d_{Xi}$ is the summed average cumulative output delays In accordance with applying equation (1) block 330 can involve: summing the averaged cumulative output delays for the output gates of the digital logic circuit to generate a summed averaged cumulative output delay for the digital logic circuit; and determining a ratio between (i) the summed averaged cumulative output delay and (ii) a product of (a) a total number of output gates of the digital logic circuit and (b) a maximum of the averaged cumulative output delays for the output gates of the digital logic circuit. Accordingly, the calculations of block 330 can output a value within the range of [0,1] in some implementations, representing the calculated fault sensitivity score for the analyzed digital logic gate. As an example, implementations shown below may be used to implement the algorithm for assessing the fault sensitivity criteria as described above. However, other code can alternatively or additionally be used. The algorithm can be implemented as shown below:

```
Require: Gate Level Netlist of the Circuit,
Ensure: Fault Sensitivity Criteria 0 ≤ FSC ≤ 1
    for all (input vectors of the circuit) do
        X: an input sequence of the circuit 1 ≤ X ≤ m
        simulate the circuit with input X
        for all (gate g in the circuit) do
            d_xg = Delay (g, inputs of g (1 ≤ i ≤ IN), arrival time for
            each input)
        end for
    end for
    Generate Table I
    Perform averaging on each column of Table I to get AVGd_xy.
    Calculate FSC from Equation 1
    Function Delay (g, inputs of g(1 ≤ i ≤ IN), arrival time for each
    input)
    if g is sensitive gate then
        if at least one input (i) of g is controlling input then
            Return g_delay + arrival_time(i)
        else
            Return g_delay + max_{1≤i≤IN}(arrival_time(i))
        end if
    else
        Return g_delay + max_{1≤i≤IN}(arrival_time(i))
    end if
    End Function
```

Some variables included in the aforementioned algorithm can be defined as shown in the Table II below:

| n | Number of input bits |
| --- | --- |
| X | Input vector (exhaustively from 1 to $2^n$ = m) |
| g | Gate |
| IN | Number of inputs for each gate (Gates can have multiple inputs, AND can have 2, 3, more, NOT only has 1) |

Next, at block 335, the process 300 can involve providing the fault sensitivity score. In an implementation, providing the fault sensitivity score includes utilizing the value as input for further analysis. As an example, implementing countermeasures can determine, based at least in part on the fault sensitivity score, whether to modify the digital logic circuit to reduce the fault sensitivity associated with the digital logic circuit. For instance, if the fault sensitivity score is determined to satisfy a criterion to modify the digital logic circuit (e.g., a threshold), the circuit can be modified by adding delay elements, such as buffers, to the digital logic circuit. In some cases, a user can be prompted, via a GUI presented to the user by a computer device, to modify the digital logic circuit to decrease the fault sensitivity score. Thus, in accordance with the assessed fault sensitivity, the cumulative output delays for the output gates of the digital logic circuit can be balanced. The prompt can include various user-selectable controls, for instance supported by the GUI, to initiate modification of the digital logic circuit. The user-selectable controls can permit the user to input various parameters for modifying the digital logic circuit. In some implementations, providing includes presenting the fault sensitivity score for presentation to a user. For instance, the Fault Sensitivity Analysis Tool 135 can be configured to display the fault sensitivity score as part of a GUI presented on the screen of a computer device.

Figure 4:
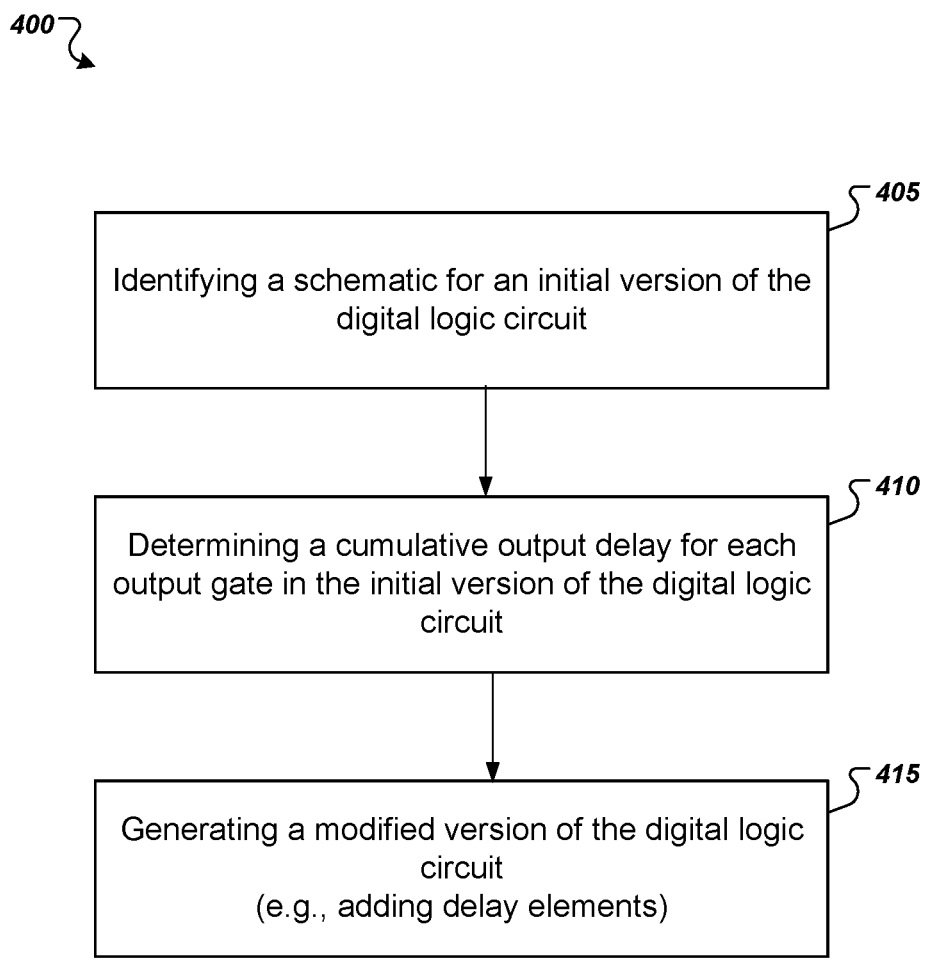
FIG. 4 illustrates a flow chart of an example process for modifying a digital logic circuit according to fault sensitivity countermeasures based on circuit analysis techniques relative to the example computing system of FIG. 1.

FIG. 4 illustrates a flow chart of an example process 400 for modifying a digital logic circuit according to fault sensitivity countermeasures based on circuit analysis techniques relative to the example computing system of FIG. 1. Process 400 begins at block 405 and includes identifying, by a device such as computer device 130, a schematic for an initial version of a digital logic circuit. The schematic can be described as a visual representation of the digital logic circuit, which specifies a plurality of digital logic gates (also referred to herein as output gates) and connections among the gates in the initial version of the digital logic circuit. The initial version of the digital logic gate can be received, or otherwise identified at block 405 as a netlist. In some implementations, the plurality of digital logic gates can include, AND gates, OR gates, Not AND (NAND) gates, Not OR (NOR) gates, and Exclusive OR (XOR) gates.

Block 410 includes determining a cumulative output delay for each output gate of the plurality of digital logic gates in the initial version of the digital logic circuit. Further, block 410 involves determining a cumulative output delay relative to a number of input vectors for the respective output gate. In some cases, the cumulative output delay is determined for all of the input vectors, as a result of the corresponding output bits. Here, a cumulative output delay is calculated for each input vector of the set of input vectors that correspond to the gate. Other cases can determine a cumulative delay for any number of input vectors, such as a single input vector, multiple input vectors (e.g., a selected portion from the set of input vectors), or an averaged number of input vector of the set of input vectors. Based on the cumulative output delays output from block 410, the process 400 can identify a longest path of the circuit (e.g., largest cumulative output date), in order to implement the delay balancing aspects of the countermeasure relative to this longest path.

Subsequently, the process 400 proceeds to block 415 that includes generating a modified version of the digital logic circuit. Modifying the digital logic circuit can be described as a fault sensitivity countermeasure that correlates to assessed fault sensitivity of the digital logic circuit as described in FIG. 3. Further, the fault sensitivity countermeasure can be conceptually described as removing the dependency of the critical timing delay to the processed data values in the digital logic circuit. The countermeasure techniques can operate at two levels of abstraction, for example at netlist level and at gate level. In the case of netlist level, the delay of the netlist is independent of the input data. At the gate level, the switching time of gates can be random during circuit evaluation, meaning that the switching distribution is uniform over the computation time of the circuit.

Block 415 includes delay balancing techniques that insert delay elements in different paths of the digital logic circuit based on the statistical timing analysis of the circuit. Delay balancing techniques equalize the effective delay of each path in a circuit. Thus, there are different techniques that can be applied by the fault sensitivity countermeasures that can achieve balancing the delays of the circuit. For instance, delay balancing can include making the arrival time of the signals and the depth of effective gate network uniform. In some cases, delay balancing involves adding delay to the digital logic circuit, in order for each path to reach the determined maximum delay, or longest path, for the circuit.

In an implementation, block 415 performs an iterative process of adding delay elements to the initial version of the digital logic circuit until one or more criteria for the modified version of the digital logic circuit are satisfied. In some implementations, one of the criteria includes that a variance between the cumulative output delays of the output gates is within a threshold. The disclosed countermeasure techniques can ensure that for each sensitive gate in the digital logic circuit, the inputs of that gate arrive at the same time. As an example, implementations shown below may be used to implement the delay balancing algorithm described above. However, other code can be used. The algorithm can be implemented as shown below:

```
Require: Gate Level Netlist of the Circuit,
Ensure: Gate Level Netlist of the Circuit with Balanced Delays in Each
Path
    while delays are not equalized do
        Generate Delay Table using Algorithm 1
        Find the maximum delay among all outputs max_d_xy.
        for all (output signals of the circuit) do
            Y : an output signal of the circuit 1 ≤ Y ≤ n
            Depth First Search (Y)
        end for
    end while
        Function Depth First Search (Y)
        Let S be a stack
            current gate g = Y // assigning the output gate to g one by one
            S.puch(g)
            while S is not empty do
                g = S.pop( )
                if g is not labeled as observed then
                    label g as observed
                    if g is sensitive gate then // label each output gate just
once by flagging it as observed
                        for all inputs of g(1 ≤ i ≤ IN) do
                            if arrival_time(i) < max_{1≤i≤IN}(arrival_time(i))
                            then
                                insert delay element at input i
                            end if
                        end for
                    end if
                    for all fanin gates of g do
                        S.push(fanin(g))
                    end for
                end if
            end while
        End Function
```

Also, in an implementation, generating the modified version of the digital logic circuit at block 415 can involve determining locations in the digital logic circuit to add delay elements, for example using a recursive depth first search. In referring to the abovementioned example of effective delay, delay elements are particularly inserted to be located near the input of each path such that the sum of effective path delay and inserted buffer delay becomes equal to the maximum effective delay. Moreover, delay insertion can include determining a number of delay elements used to modify the digital logic circuit at block 415. Referring again to the effective delay example, the number of delay elements is calculated in inverse proportion to the length of the path.

Additionally, block 415 includes performing delay insertion by adding the delay elements to the initial version of the digital logic circuit without causing a change, or otherwise altering, the values of output of the digital logic circuit. Restated, the modified version of the digital logic circuit, which is the result of the countermeasure techniques, generates the same output vector (referring to the combination of output bits) as the initial version of the digital logic circuit for all input vectors.

In some cases, the fault sensitivity countermeasure exhaustively adds delay elements to modify the circuit in a manner that produces a large overhead on the digital logic circuit. Therefore, in some implementations, countermeasures further incorporate a genetic algorithm to generate a modified design that is optimized for minimizing overhead due to the number of delay elements added to the digital logic circuit, and maximizing the eliminated fault sensitivity. As previously discussed, it should be appreciated that other forms of AI heuristics, not limited to the genetic algorithm, can be used to implement optimization.

According to the implementations implementing the genetic algorithm, block 415 can include generating a modified version of the digital logic circuit that minimizes (i) the variance between the cumulative output delays of the output gates of the modified version of the digital logic circuit and (ii) the physical size of the modified version of the digital logic circuit. In some implementations, the countermeasure techniques consider a physical size of the modified version of the digital logic circuit to control the associated overhead. For example, one of the criteria for the modified version of the digital logic circuit is based on a physical size of the modified version of the circuit. Moreover, a criterion can be applied, during the modification at block 415, that the physical size of the modified version of the digital logic circuit, or an increase in the physical size from the initial digital logic circuit, be less than a threshold. Thus, the fault sensitivity countermeasures substantially reduce fault sensitivity of the digital logic circuit, while balancing the design tradeoffs associated with circuit area overhead due to delay insertion.

Figure 5:
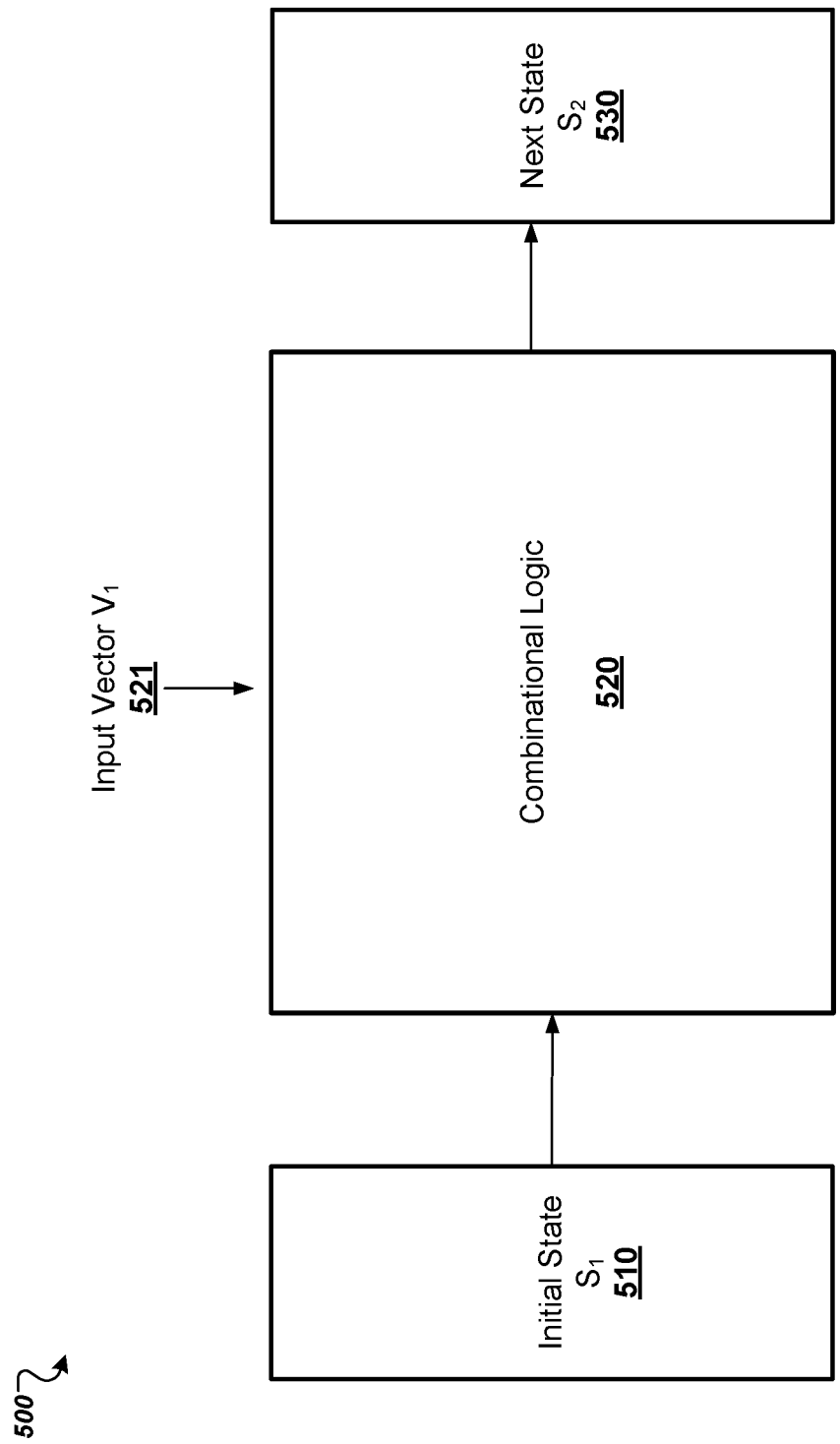
FIG. 5 illustrates an example of a digital logic circuit and depicts a correlation between input vectors of the digital logic circuit and a fault sensitivity of the circuit.

FIG. 5 illustrates an example of a digital logic circuit 500 and depicts a correlation between input vectors 521 of the digital logic circuit and a fault sensitivity of the circuit. As shown, a combination logic 520 can include unidirectional output gates. Inputs of the combination logic 520 can be driven by a set of flip-flops (FFs) and outputs drive another set of FFs. A common clock can control the FFs. In an example, an attacker can access the value of the FFs of the design, which can be the input vector and output vectors of the design. As illustrated in FIG. 3, the delay of each circuit can be dependent to an initial state $S_1$ 510 and its input vectors $V_1$ 521, which are used to generate the next valid state $S_2$ 530.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for assessing a fault sensitivity of a digital logic circuit having a plurality of digital logic gates including a plurality of output gates, the method comprising:
   obtaining a set of input vectors that represent possible inputs to the digital logic circuit, each input vector comprising a unique sequence of binary values;
   for each output gate of the plurality of output gates:
      (i) for each input vector of the set of input vectors, determining a cumulative output delay for the output gate, the cumulative output delay representing a time delay between application of the input vector to the digital logic circuit and generation of a stable output value by the output gate as a result of the application of the input vector to the digital logic circuit, and
      (ii) determining an averaged cumulative output delay for the output gate by averaging the cumulative output delays for the output gate that were determined for multiple input vectors of the set of input vectors;
   generating a fault sensitivity score that indicates a measure of vulnerability of the digital logic circuit to fault sensitivity attacks, wherein generating the fault sensitivity score includes comparing a highest of the averaged cumulative output delays for the plurality of output gates to others of the averaged cumulative output delays for the plurality of output gates;
   determining, based at least in part on the fault sensitivity score, whether to modify the digital logic circuit through addition of digital logic gates that would decrease the fault sensitivity of the digital logic circuit; and
   in response to determining to modify the digital logic circuit, providing additional digital logic gates in the digital logic circuit that result in decreasing the fault sensitivity of the digital logic circuit.

2. The method of claim 1, wherein:
   determining whether to modify the digital logic circuit comprises comparing the fault sensitivity score to a threshold score.

3. The method of claim 1, further comprising providing the fault sensitivity score for presentation on a display device to a user.

4. The method of claim 1, further comprising determining whether the fault sensitivity score satisfies a criterion for prompting the user to modify the digital logic circuit to decrease the fault sensitivity of the digital logic circuit; and
   in response to determining that the fault sensitivity score satisfies the criterion for prompting the user to modify the digital logic circuit, prompting the user to modify the digital logic circuit decrease the fault sensitivity of the digital logic circuit, including displaying the prompt on a display device for presentation to the user.

5. The method of claim 4, wherein the prompt includes at least one of a first user-selectable control to initiate modification of the digital logic circuit or one or more second user-selectable controls that permit the user to input parameters for modifying the digital logic circuit.

6. The method of claim 1, wherein comparing the highest of the averaged cumulative output delays for the plurality of output gates to others of the averaged cumulative output delays for the plurality of output gates to generate the fault sensitivity score comprises:
   summing the averaged cumulative output delays for the plurality of output gates of the digital logic circuit to generate a summed averaged cumulative output delay for the digital logic circuit; and
   determining a ratio between (i) the summed averaged cumulative output delay and (ii) a product of (a) a total number of output gates in the plurality of output gates of the digital logic circuit and (b) the highest of the averaged cumulative output delays for the plurality of output gates of the digital logic circuit.

7. The method of claim 1, wherein for each output gate of the plurality of output gates, determining the averaged cumulative output delay for the output gate comprises averaging the cumulative output delays for the output gate that were determined for the entire set of input vectors.

8. The method of claim 1, wherein the plurality of digital logic gates comprise at least one of an AND gate, an OR gate, a NAND gate, a NOR gate, or an XOR gate.

9. The method of claim 1, wherein the plurality of output gates of the digital logic circuit are a proper subset of the plurality of digital logic gates in the digital logic circuit.

10. The method of claim 1, wherein determining the cumulative output delay for the output gate comprises summing an arrival delay time of a controlling input for the output gate and a gate delay time of the output gate.

11. The method of claim 1, wherein providing additional digital logic gates in the digital logic circuit that result in decreasing the fault sensitivity of the digital logic circuit comprises adding delay elements to the digital logic circuit in a manner that balances the cumulative output delays for the output gates of the digital logic circuit.

12. A method for assessing a fault sensitivity of a digital logic circuit having a plurality of digital logic gates including a plurality of output gates, the method comprising:
    obtaining a set of input vectors that represent possible inputs to the digital logic circuit, each input vector comprising a unique sequence of binary values;
    for each output gate of the plurality of output gates:
        (i) for each input vector of the set of input vectors, determining a cumulative output delay for the output gate, the cumulative output delay representing a time delay between application of the input vector to the digital logic circuit and generation of a stable output value by the output gate as a result of the application of the input vector to the digital logic circuit, and
        (ii) determining an averaged cumulative output delay for the output gate by averaging the cumulative output delays for the output gate that were determined for multiple input vectors of the set of input vectors;
    generating a fault sensitivity score that indicates a measure of vulnerability of the digital logic circuit to fault sensitivity attacks, wherein generating the fault sensitivity score includes comparing a highest of the averaged cumulative output delays for the plurality of output gates to others of the averaged cumulative output delays for the plurality of output gates;
    determining, based at least in part on the fault sensitivity score, whether to modify the digital logic circuit through addition of digital logic gates that would decrease the fault sensitivity of the digital logic circuit; and
    in response to determining not to modify the digital logic circuit, electing not to add digital logic gates in the digital logic circuit that would result in decreasing the fault sensitivity of the digital logic circuit.

13. The method of claim 12, wherein:
    determining whether to modify the digital logic circuit comprises comparing the fault sensitivity score to a threshold score.

14. The method of claim 12, further comprising providing the fault sensitivity score for presentation on a display device to a user.

15. The method of claim 12, further comprising determining whether the fault sensitivity score satisfies a criterion for prompting the user to modify the digital logic circuit to decrease the fault sensitivity of the digital logic circuit; and
    in response to determining that the fault sensitivity score satisfies the criterion for prompting the user to modify the digital logic circuit, prompting the user to modify the digital logic circuit decrease the fault sensitivity of the digital logic circuit, including displaying the prompt on a display device for presentation to the user.

16. The method of claim 15, wherein the prompt includes at least one of a first user-selectable control to initiate modification of the digital logic circuit or one or more second user-selectable controls that permit the user to input parameters for modifying the digital logic circuit.

17. The method of claim 12, wherein comparing the highest of the averaged cumulative output delays for the plurality of output gates to others of the averaged cumulative output delays for the plurality of output gates to generate the fault sensitivity score comprises:
    summing the averaged cumulative output delays for the plurality of output gates of the digital logic circuit to generate a summed averaged cumulative output delay for the digital logic circuit; and
    determining a ratio between (i) the summed averaged cumulative output delay and (ii) a product of (a) a total number of output gates in the plurality of output gates of the digital logic circuit and (b) the highest of the averaged cumulative output delays for the plurality of output gates of the digital logic circuit.

18. The method of claim 12, wherein for each output gate of the plurality of output gates, determining the averaged cumulative output delay for the output gate comprises averaging the cumulative output delays for the output gate that were determined for the entire set of input vectors.

19. The method of claim 12, wherein the plurality of digital logic gates comprise at least one of an AND gate, an OR gate, a NAND gate, a NOR gate, or an XOR gate.

20. The method of claim 12, wherein determining the cumulative output delay for the output gate comprises summing an arrival delay time of a controlling input for the output gate and a gate delay time of the output gate.

21. A method for assessing a fault sensitivity of a digital logic circuit having a plurality of digital logic gates including a plurality of output gates, the method comprising:
    obtaining a set of input vectors that represent possible inputs to the digital logic circuit, each input vector comprising a unique sequence of binary values;
    for each output gate of the plurality of output gates:
        (i) for each input vector of the set of input vectors, determining a cumulative output delay for the output gate, the cumulative output delay representing a time delay between application of the input vector to the digital logic circuit and generation of a stable output value by the output gate as a result of the application of the input vector to the digital logic circuit, and
        (ii) determining an averaged cumulative output delay for the output gate by averaging the cumulative output delays for the output gate that were determined for multiple input vectors of the set of input vectors;
    generating, based on the averaged cumulative output delays for the output gates of the digital logic circuit, a fault sensitivity score that indicates a measure of vulnerability of the digital logic circuit to fault sensitivity attacks;
    determining, based at least in part on the fault sensitivity score, whether to modify the digital logic circuit through addition of digital logic gates that would decrease the fault sensitivity of the digital logic circuit; and
    in response to determining to modify the digital logic circuit, providing additional digital logic gates in the digital logic circuit that result in decreasing the fault sensitivity of the digital logic circuit.

\* \* \* \* \*